US009982615B2

United States Patent
Lang et al.

(10) Patent No.: US 9,982,615 B2
(45) Date of Patent: May 29, 2018

(54) METHOD FOR PREDEFINING A CURRENT IN A SOLENOID VALVE

(71) Applicant: Robert Bosch GmbH, Stuttgart (DE)

(72) Inventors: Heike Lang, Heimsheim (DE); Frank Schmitt, Stuttgart (DE); Ralph Kober, Schwieberdingen (DE); Holger Rapp, Ditzingen (DE); Fabian Fischer, Stuttgart (DE); Marco Beier, Leonberg (DE); Stefan Stein, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 259 days.

(21) Appl. No.: 14/882,666

(22) Filed: Oct. 14, 2015

(65) Prior Publication Data

US 2016/0102779 A1    Apr. 14, 2016

(30) Foreign Application Priority Data

Oct. 14, 2014    (DE) .................. 10 2014 220 795

(51) Int. Cl.
| | |
|---|---|
| F02D 41/20 | (2006.01) |
| F02M 57/00 | (2006.01) |
| F02D 41/22 | (2006.01) |
| F02D 41/24 | (2006.01) |
| F02M 47/02 | (2006.01) |

(52) U.S. Cl.
CPC ........... *F02D 41/20* (2013.01); *F02D 41/221* (2013.01); *F02D 41/2467* (2013.01); *F02M 57/005* (2013.01); *F02D 2041/2055* (2013.01); *F02D 2041/2058* (2013.01); *F02D 2041/224* (2013.01); *F02D 2200/0602* (2013.01); *F02D 2200/063* (2013.01); *F02M 47/027* (2013.01); *Y02T 10/40* (2013.01)

(58) Field of Classification Search
CPC ...... F02D 41/20; F02D 41/2467; F02D 41/21; F02D 2041/2058; F02D 2041/2055; F02D 2200/063; F02D 2200/0602; F02D 2041/224; F02M 57/005; F02M 47/027; Y02T 10/40; F16K 31/0651; F16K 31/0655; F16K 31/0658; F16K 31/0662
USPC ......... 251/129.15, 129.04; 123/490; 361/154
See application file for complete search history.

(56) References Cited

U.S. PATENT DOCUMENTS

| 8,087,400 B2 * | 1/2012 | Achleitner .............. F02D 41/20 123/445 |
|---|---|---|
| 2010/0280743 A1 * | 11/2010 | Hehle ..................... G01L 23/24 701/103 |

FOREIGN PATENT DOCUMENTS

| DE | 10 2007 057 144 | 6/2009 |
|---|---|---|
| DE | 10 2007 058 230 | 6/2009 |
| DE | 10 2010 000 827 | 7/2011 |
| JP | 07046676 A * | 2/1995 |

* cited by examiner

*Primary Examiner* — Marina Tietjen
(74) *Attorney, Agent, or Firm* — Norton Rose Fulbright US LLP

(57) ABSTRACT

A method for predefining a current through a solenoid coil of a solenoid valve, a closing point in time of the solenoid valve being detected with the aid of a sensor, a sensor value being monitored, and, when a premature closing of the solenoid valve is identified based on the monitored sensor value, the current through the solenoid coil of the solenoid valve is increased.

14 Claims, 2 Drawing Sheets

METHOD FOR PREDEFINING A CURRENT IN A SOLENOID VALVE

FIELD OF THE INVENTION

The present invention relates to a method for predefining a current in a solenoid valve, in particular in a solenoid valve injector of an internal combustion engine.

BACKGROUND INFORMATION

Solenoid valve injectors may be used in internal combustion engines including a so-called common-rail system. In these systems, fuel is injected by electrically activating a solenoid valve, whereby the same is either opened or closed. This creates pressure conditions in the injector based on which a spring-restored nozzle needle is lifted and thus the injection process is initiated. The start of the delivery is established via the opening point in time of the solenoid valve. The fuel metering takes place between the start of the delivery and the closing point in time following the end of the activation of the solenoid valve during a time period referred to as the delivery duration.

Due to the high accuracy requirements with respect to the injection amounts in modern engines, it is necessary to preferably precisely adhere to the particular opening or closing points in time of the solenoid valves in order to precisely meter the amount of the supplied fuel.

In solenoid valve injectors, previously a current level (in particular for the holding current) was ascertained and established during a development phase, which is then later predefined as the setpoint value during operation in the internal combustion engine. For this purpose, the setpoint value is stored in a control unit, for example, in particular in an engine control unit, and set during activation. The injector then usually remains opened for the duration of the activation (energization).

However, aging effects, deposits, in particular fuel deposits, increased fuel viscosity, seat wear and the like may cause a magnetic force demand for keeping the solenoid valve injector open to rise during the operation. However, since the current level is stored as a fixed setpoint value, it is possible that the solenoid valve injector closes prematurely, i.e., even during the activation. This results in a reduced injection amount and thus negatively influences the running behavior of the internal combustion engine.

A method for compensating a control current for a solenoid control valve is known from German Published Patent Application No. 10 2007 058 230, in which a deviation of a magnetic force is compensated for by adjusting the current level of the control current.

A method for ascertaining an adapted control signal, for example for solenoid injectors, is known from German Published Patent Application No. 10 2007 057 144, in which the adapted control signal is iteratively ascertained.

It is therefore desirable to provide an option for deliberately adapting the magnetic force required for keeping a solenoid valve open.

SUMMARY

A method according to the present invention is suitable for predefining a current through a solenoid coil of a solenoid valve, whereby it is possible in particular to regulate the magnetic force in the solenoid valve. With the aid of a sensor, a closing point in time of the solenoid valve is detected and a sensor value is monitored. If a premature closing of the solenoid valve is identified based on the monitored sensor value, the current through the solenoid coil of the solenoid valve is thereupon increased, advantageously during a subsequent activation.

Solenoid valves are used in particular in solenoid valve injectors for internal combustion engines. A desired setpoint opening time corresponds to a calculated time duration, for example, during which fuel is to be injected into a combustion chamber of an internal combustion engine. If a premature closing is now identified, the current in the solenoid valve is increased, which means an increase in the magnetic force. The solenoid valve, and thus the solenoid valve injector, remain open as desired, in particular for subsequent injection processes.

In this way, an increase in the robustness of systems which include solenoid valves, for example of so-called common-rail systems, under extreme conditions is achievable. Moreover, a functionality in an extended operating range, for example in the case of deposits in the component, wear in the seat area or the like, may be ensured.

The sensor used may be a sensor, for example, which monitors a pressure in a valve chamber in which the solenoid valve is situated, or a position of a valve needle. For example, the sensor may be situated in the valve chamber for this purpose. The determination of a closing point in time from a valve chamber pressure is described in DE 10 2010 000 827 A1, for example. The closing point in time may be directly derived from the position of the valve needle. The closing point in time may also be ascertained from the voltage signal at the solenoid coil. This voltage signal may be used to infer a movement of the armature.

A premature closing of the solenoid valve based on the monitored sensor value is preferably identified when the sensor value reaches or exceeds a sensor threshold value. In sensors which may be used, a sensor threshold value may be found, which indicates a closing of the solenoid valve. In the above-mentioned pressure sensor, for example, a zero crossing of the sensor signal indicates that the valve has closed. If the movement of the valve needle or of the armature is monitored, the sensor values indicating the final position are relevant. As an alternative or in addition, a premature closing of the solenoid valve based on the monitored sensor value is identified when a gradient over time of a chronological progression of the sensor value reaches or exceeds a gradient threshold value. In sensors which may be used, a gradient threshold value may be found, which indicates a closing of the solenoid valve. In the above-mentioned pressure sensor, for example, a virtually sudden change (i.e., high gradient) of the sensor signal indicates that the valve has closed. If the movement of the valve needle or of the armature is monitored, usually a kink is present in the sensor signal, followed by a low gradient, when the final position has been reached. In this way, a premature closing may be identified in a simple manner.

Advantageously, the current through the solenoid coil in the solenoid valve is only increased up to a maximum value. In this way, undesirably high currents may be avoided, and potential damage resulting therefrom does not materialize.

It is advantageous if a diagnostic message is created when the current through the solenoid coil in the solenoid valve reaches a diagnostic value (e.g., the maximum value). In particular, the diagnostic message may also be stored, for example in a suitable memory area of a control unit. In this way, a defective or contaminated solenoid valve may be quickly identified. The solenoid valve may thus be deliberately replaced or cleaned during a visit to a repair shop.

The sensor value is preferably monitored during, in particular also only during, a time period in which the solenoid valve is activated. This allows deliberate monitoring of the solenoid valve with respect to the behavior in an open position. Moreover, unnecessary energy consumption for monitoring during times in which it is not necessary may be avoided.

The current through the solenoid coil of the solenoid valve is advantageously increased in an activation process following the activation process during which the premature closing of the solenoid valve was indicated. Depending on the duration of the evaluation and/or necessary calculations, the current may be appropriately increased already during the directly following activation process, or else several activation processes later. In the preferred use as a fuel injector, an activation process corresponds to an injection process.

In this context it shall also be noted that, in this way, an iterative increase may take place, as long as the solenoid valve no longer closes prematurely.

It is also advantageous if a value of the current, after the current has been increased, is stored for subsequent activation processes as a new value of the current. For this purpose, storing in a control unit is possible, for example. In this way, an instantaneous setpoint value for the current may be resorted to for further activation processes, in particular also after a restart. Such a tracking adjustment of a variable to changed conditions is usually referred to as adaption.

An arithmetic unit according to the present invention, e.g., a control unit of a motor vehicle, is configured, in particular from a programming point of view, to carry out a method according to the present invention.

The implementation of the method in the form of software is also advantageous since this results in particularly low costs, in particular when an executing control unit is also used for additional tasks and is therefore present anyhow. Suitable data carriers for providing the computer program are in particular floppy disks, hard disks, flash memories, EEPROMs, CD-ROMs, DVDs, and the like. It is also possible to download a program via computer networks (Internet, Intranet, and the like).

Further advantages and embodiments of the present invention are derived from the description and the accompanying drawings.

It goes without saying that the above-mentioned features and those still to be described hereafter may be used not only in the particular described combination, but also in other combinations, or alone, without departing from the scope of the present invention.

The present invention is shown schematically based on one exemplary embodiment in the drawing and is described in greater detail hereafter with reference to the drawing.

DETAILED DESCRIPTION

Figure 1:
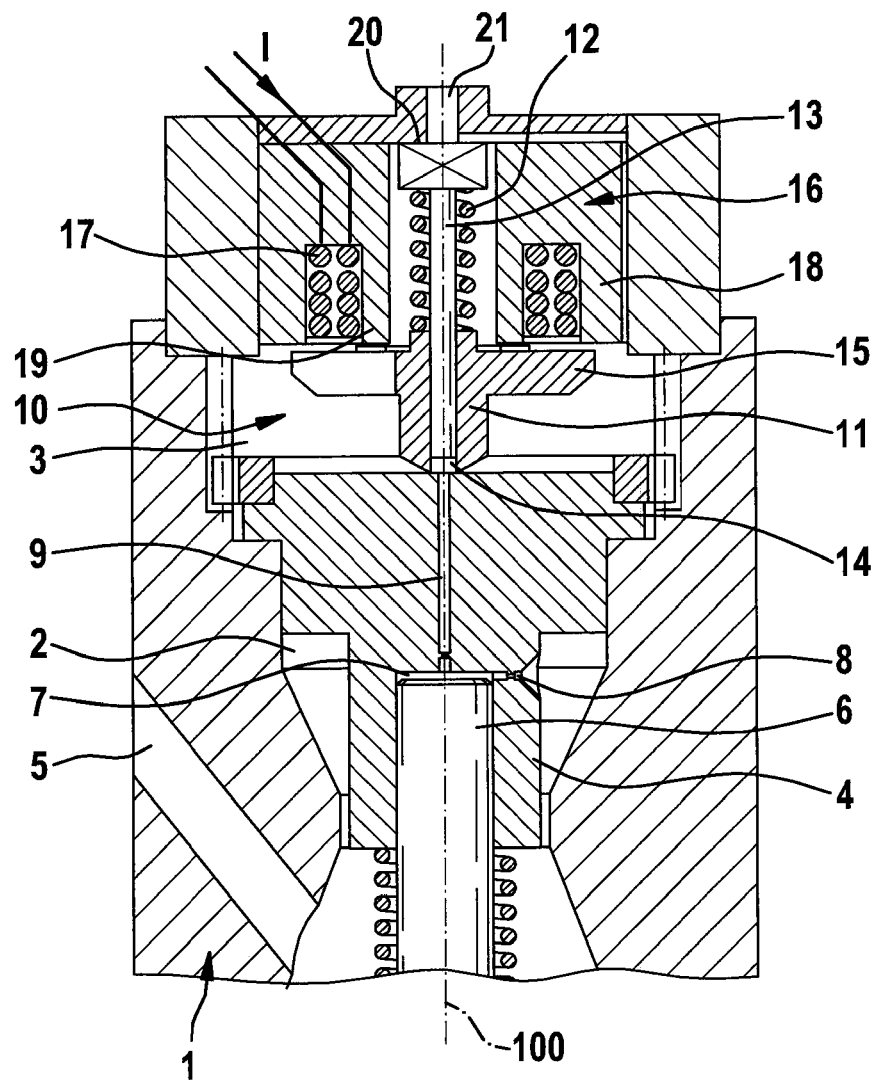
FIG. 1 shows a section of a solenoid valve injector operable with the aid of a method according to the present invention according to one preferred specific embodiment.

FIG. 1 shows a section of a solenoid valve injector by way of example, in which a method according to the present invention may be carried out. A high-pressure chamber 2 and a low-pressure chamber 3 are situated within an injector body 1. These two chambers are separated from each other by a valve piece 4. High-pressure chamber 2 communicates via an inflow channel 5 with a high-pressure source for fuel, generally a so-called common rail, the high-pressure source not being shown. Low-pressure chamber 3 is connected via a return line 21 or the like to a fuel tank or the like.

High-pressure chamber 2 is connectable via injector nozzles, which are not shown, to a combustion chamber of an internal combustion engine, which is also not shown. The injector nozzles are controlled in the known manner with the aid of a nozzle needle, of which FIG. 1 shows only the end far away from the nozzles, which is designed as a plunger 6. Plunger 6, acting as a displacement body, is situated in a control chamber 7 situated in valve piece 4. This control chamber 7 communicates via an inflow throttle 8 with high-pressure chamber 2, and via a preferably throttled outflow channel 9 with low-pressure chamber 3, outflow channel 9 being controlled with the aid of a solenoid valve 10 operating as a control valve.

When the outflow channel is closed off with the aid of control valve 10 and the nozzle needle is in its closed position, the same high pressure as in high-pressure chamber 2 develops in control chamber 7, with the consequence that plunger 6 in FIG. 1 is pressed downward, and the nozzle needle connected thereto is held in the closed position closing off the injector nozzles. When outflow channel 9 is opened with the aid of control valve 10, a reduced pressure compared to the high pressure in high-pressure chamber 2 develops in control chamber 7, and plunger 6 together with the nozzle needle in FIG. 1 is displaced in the upward direction, i.e., the nozzle needle is set to its open position so that fuel is injected through the injector nozzles into the combustion chamber.

Control valve 10 has a sleeve-shaped closing body 11, which is tensioned by a closing spring 12, designed as a helical compression spring, against a seat which is concentric with respect to the outlet opening of outflow channel 9. In the example of FIG. 1, the seat is designed as a planar surface on which sleeve-shaped closing body 11 rests with a line-shaped annular edge. However, generally it is also possible to provide a differently shaped seat.

Sleeve-shaped closing body 11 is axially displaceably guided on a guide rod 13 which is coaxial with respect to longitudinal axis 100 of injector body 1, the annular gap between the inner circumference of closing body 11 and the outer circumference of guide rod 13 being designed as a practically leak-free throttle or sealing gap. When closing body 11 assumes the closed position shown in FIG. 1, pressure chamber 14 which is formed within closing body 11 and communicates via outflow channel 9 with control chamber 7, and then accordingly has the same fluid pressure as control chamber 7, is closed off with respect to low-pressure chamber 3.

A star-shaped armature 15 of a solenoid system 16 is situated on closing body 11 and is provided as an actuator for actuating control valve 10. Closing body 11 and armature 15 may be designed as one component or also as two components. In the known manner, this solenoid system 16 includes a solenoid coil 17, which is situated within a solenoid system which is concentric with respect to guide rod 13 and has an annular outer pole 18 and an annular inner pole 19. When solenoid coil 17 is energized with a current I, armature 15 is magnetically attracted by poles 18 and 19, so that closing body 11 is lifted off its seat against the force of closing spring 12 and control valve 10 is opened.

During the closed phase of the nozzle needle connected to plunger 6, i.e., with closed injector nozzles, control valve 10 is closed, and the same fluid pressures are present in pressure chamber 14 and in control chamber 7. Immediately prior to the closing point in time of the nozzle needle, the pressure in control chamber 7 drops due to the low pressure at this point in time beneath the nozzle seat of the nozzle needle and the attendant closing movement of plunger 6 under the high pressure in inflow channel 5. Immediately after the nozzle needle is closed, the now stopped plunger 6 results in a steep rise in the pressure in control chamber 7, the control chamber pressure increasing to the pressure in inflow channel 5.

The solenoid valve injector moreover includes a sensor 20, with the aid of which a closing point in time of solenoid valve 10 is detected. For example, sensor 20 may be designed as a piezoelectric sensor, which detects a valve chamber pressure present in valve chamber 14, and outputs a corresponding signal having a voltage U, which is detected by a control unit.

Figure 2:
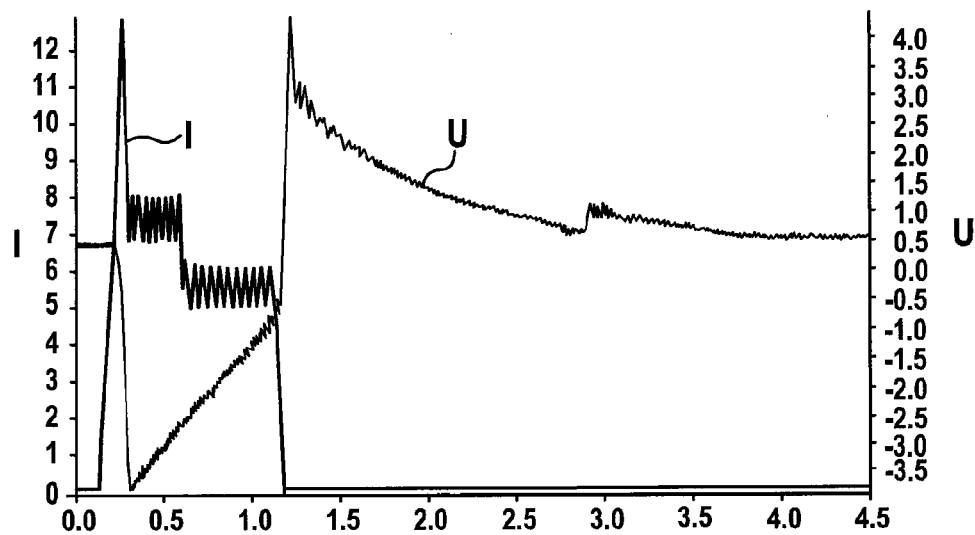
FIG. 2 shows the current progression in a solenoid valve and a voltage progression of a sensor.

FIG. 2 shows, by way of example in a diagram, a progression of current I in A through solenoid coil 17 of solenoid valve 10 and a progression of the sensor value formed as voltage U in V, which is output by sensor 20, over time t in ms. The progressions shown here correspond to a regular behavior of solenoid valve 10.

As is apparent from the diagram, current I is switched on at point in time t=0.2 ms, which is identifiable from the current peak (switch-on peak). Up until this point in time, voltage U is approximately 0.5 V, which corresponds to a position of solenoid valve 10 in the idle state (closed). At point in time t=0.2 ms, current I is switched on, which is visible from a so-called boost current (switch-on peak) up to approximately 13 A. Voltage U jumps to −4 V, which corresponds to a completely open position of solenoid valve 10.

Current I is set on average to a value of 7.5 A, a so-called inrush current. At point in time t=0.6 ms, current I is set to a lower value of 5.5 A on average, a so-called holding current, until current I is switched off at point in time 1.1 ms. Voltage U rises in the time from t=0.2 ms to t=1.1 ms with an almost constant slope, i.e., a constant gradient, from −4 V to −1 V. This corresponds to a uniform, slow discharge of the piezoelectric sensor, which takes place despite the solenoid valve being open. At point in time t=1.2 ms, as current I is switched off or the activation ends, the voltage rises suddenly with a larger slope, i.e., a larger gradient, up to more than 4 V. This indicates a sudden pressure change by closing of solenoid valve 10.

Figure 3:
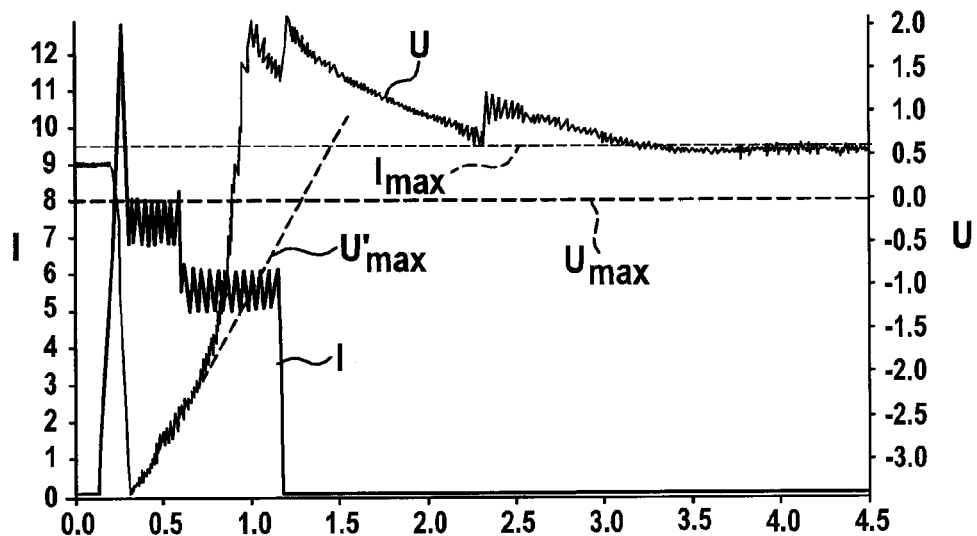
FIG. 3 shows the current progression in a solenoid valve and a voltage progression of a sensor, including a limiting value and a maximum value, of a method according to the present invention according to one preferred specific embodiment.

FIG. 3 shows, by way of example in a diagram, a progression of current I in A through solenoid coil 17 of solenoid valve 10 and a progression of the sensor value formed as voltage U in V, which is output by sensor 20, over time t in ms. In addition, a sensor threshold value $U_{max}$, a gradient threshold value $U'_{max}$, and a maximum value $I_{max}$ according to a method according to the present invention are shown in one preferred specific embodiment. The progressions shown here correspond to an operation of solenoid valve 10 in which solenoid valve 10 closes prematurely.

The progressions of current I and voltage U correspond to those of FIG. 2 until current I is switched on at point in time t=0.2 ms. It is apparent from the irregularity in the progression of voltage U at t=0.5 ms that armature 15 has dropped so much that solenoid valve 10 closes, or is not open as much as would be necessary. It is furthermore apparent that voltage U rises steeply already before the activation ends. This, in turn, is indicated by the sudden change in pressure resulting from the closing of solenoid valve 10—which here now takes place prematurely since it is prior to the end of the activation. The reason for this lies in possible deposits in solenoid valve 10 or in other effects mentioned at the outset, as a result of which an increased magnetic force would be necessary to keep solenoid valve 10 or armature 15 open.

According to the present invention, it is possible for the control unit now, as soon as voltage U prematurely exceeds sensor threshold value $U_{max}$, which in particular has the value zero, to increase current I in solenoid valve 10, so that the magnetic force generated by solenoid coil 17 is sufficient again in a subsequent injection process to keep armature 15, and thus solenoid valve 10, open.

Moreover, a gradient threshold value $U'_{max}$ is plotted, which in the present example corresponds approximately to the slope of voltage U, as it occurs during the slow, steady discharge of the piezoelectric sensor. During closing of solenoid valve 10, this gradient threshold value $U'_{max}$ is exceeded, whereby in the present example, alternatively or additionally to threshold value $U_{max}$, a premature closing is identifiable.

It shall be noted in this regard that an increase in current I may mean both an increase in the inrush current, with the time duration of the inrush current remaining the same, and an increase in the holding current, at least for a starting time. In particular, the holding current may be increased up to the level of the inrush current, which is equivalent to an extension of the time duration of the inrush current.

However, current I is furthermore only increased until a maximum value $I_{max}$ is reached. This prevents an overloading of solenoid valve 10, in particular of solenoid coil 17, which would result in damage to solenoid valve 10, and potentially also the feed lines.

Should current I have to be increased up to a diagnostic value (for example, up to maximum value $I_{max}$), additionally a diagnostic message, for example in the form of a fault memory entry, is generated and stored. In this way, for example during a stay in a repair shop, solenoid valve 10 may be deliberately replaced or repaired, or else other potential causes may be inferred.

What is claimed is:

1. A method for predefining a current through a solenoid coil of a solenoid valve, comprising:
   detecting a closing point in time of the solenoid valve via a sensor;
   monitoring a sensor value;
   identifying a premature closing of the solenoid valve based on the monitored sensor value;
   increasing the current through the solenoid coil of the solenoid valve based on the identifying of the premature closing;
   wherein the increasing of the current includes iteratively increasing the current over a plurality of activations of the solenoid valve until solenoid value is no longer identified as closing prematurely.

2. The method as recited in claim 1, wherein the premature closing of the solenoid valve is identified based on the monitored sensor value when the sensor value reaches or exceeds a sensor threshold value.

3. The method as recited in claim 1, wherein the premature closing of the solenoid valve is identified based on the monitored sensor value when a gradient over time of a chronological progression of the sensor value one of reaches or exceeds a gradient threshold value.

4. The method as recited in claim 1, wherein the current through the solenoid coil in the solenoid valve is only increased up to a maximum value.

5. The method as recited in claim 1, further comprising creating a diagnostic message when the current through the solenoid coil in the solenoid valve is increased to a diagnostic value.

6. The method as recited in claim 1, wherein the sensor value is monitored during a time period in which the solenoid coil is activated.

7. The method as recited in claim 1, wherein the sensor value is output as a voltage signal by the sensor.

8. The method as recited in one of the preceding claims, wherein the current through the solenoid coil of the solenoid valve is increased in an activation process following an activation process in which the premature closing of the solenoid valve has been identified.

9. The method as recited in claim 1, further comprising storing, after the current has been increased, a value of the current for subsequent activation processes as a new value of the current.

10. The method as recited in claim 1, wherein the solenoid valve is used for a solenoid valve injector for injecting fuel into a combustion chamber of an internal combustion engine.

11. The method as recited in claim 10, wherein the fuel is injected from a high-pressure accumulator.

12. The method as recited in claim 1, wherein after each increase of the current, a value of the current is stored and is used in a subsequence activation of the solenoid valve.

13. A non-transitory machine-readable storage medium having a computer program for predefining a current through a solenoid coil of a solenoid valve stored thereon, the computer program, when executed by an arithmetic unit, causing the arithmetic unit to perform:
  detecting a closing point in time of the solenoid valve via a sensor;
  monitoring a sensor value;
  identifying a premature closing of the solenoid valve based on the monitored sensor value;
  increasing the current through the solenoid coil of the solenoid valve based on the identifying of the premature closing;
  wherein the increasing of the current includes iteratively increasing the current over a plurality of activations of the solenoid valve until solenoid valve is no longer identified as closing prematurely.

14. The non-transitory machine-readable medium as recited in claim 13, wherein after each increase of the current, a value of the current is stored and is used in a subsequence activation of the solenoid valve.

* * * * *